US009189958B2

(12) United States Patent
Gee et al.

(10) Patent No.: US 9,189,958 B2
(45) Date of Patent: Nov. 17, 2015

(54) PREDICTIVE EHORIZON

(75) Inventors: Robert Gee, Lake Barrington, IL (US); Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 111 days.

(21) Appl. No.: 13/577,429

(22) PCT Filed: Feb. 7, 2011

(86) PCT No.: PCT/EP2011/051710
§ 371 (c)(1), (2), (4) Date: Sep. 12, 2012

(87) PCT Pub. No.: WO2011/098414
PCT Pub. Date: Aug. 18, 2011

(65) Prior Publication Data

US 2013/0006531 A1 Jan. 3, 2013

(30) Foreign Application Priority Data

Feb. 9, 2010 (DE) ........................ 10 2010 007 260

(51) Int. Cl.
*G01C 21/00* (2006.01)
*G08G 1/0968* (2006.01)

(52) U.S. Cl.
CPC ................................ *G08G 1/096827* (2013.01)

(58) Field of Classification Search
CPC ............................................... G08G 1/096827
See application file for complete search history.

(56) References Cited

U.S. PATENT DOCUMENTS

| | | | | |
|---|---|---|---|---|
| 6,735,515 | B2 * | 5/2004 | Bechtolsheim et al. | 701/532 |
| 6,865,459 | B2 * | 3/2005 | Harms et al. | 701/36 |
| 7,330,103 | B2 | 2/2008 | Boss et al. | |
| 2011/0054716 | A1 | 3/2011 | Stählin et al. | |

FOREIGN PATENT DOCUMENTS

| | | | |
|---|---|---|---|
| DE | 10 2005 004 569 | A1 | 8/2006 |
| DE | 10 2005 049 133 | A1 | 4/2007 |
| DE | 10 2006 019 111 | A1 | 10/2007 |
| DE | 10 2009 008 959 | A1 | 9/2009 |
| DE | 10 2010 028 877 | A1 | 12/2010 |
| EP | 0 770 979 | A1 | 5/1997 |
| EP | 2 042 833 | A1 | 4/2009 |
| EP | 2 159 777 | A2 | 3/2010 |

OTHER PUBLICATIONS

Jean-Charles Pandazis; Ertico; Adasis Forum; "Advancing map-enhanced driver assistance systems"; http:/www.ertico.com/adasisforum.

* cited by examiner

*Primary Examiner* — John Q Nguyen
*Assistant Examiner* — Alan D Hutchinson
(74) *Attorney, Agent, or Firm* — Cozen O'Connor

(57) ABSTRACT

A method for optimizing the provision of a predictive eHorizon in a driver assistance system. A method for providing a predictive eHorizon in a driver assistance system is provided, wherein a horizon provider in a driver assistance system makes information about an expected route course available to an assistance application. The horizon provider creates a planning table including information about the expected route course and/or including data to be provided as a function of the route course, associated with an expected position of the vehicle in the planning table. The planning table data to be provided by the assistance system application are taken at least partially from the planning table as a function of the current position of the vehicle.

8 Claims, 1 Drawing Sheet

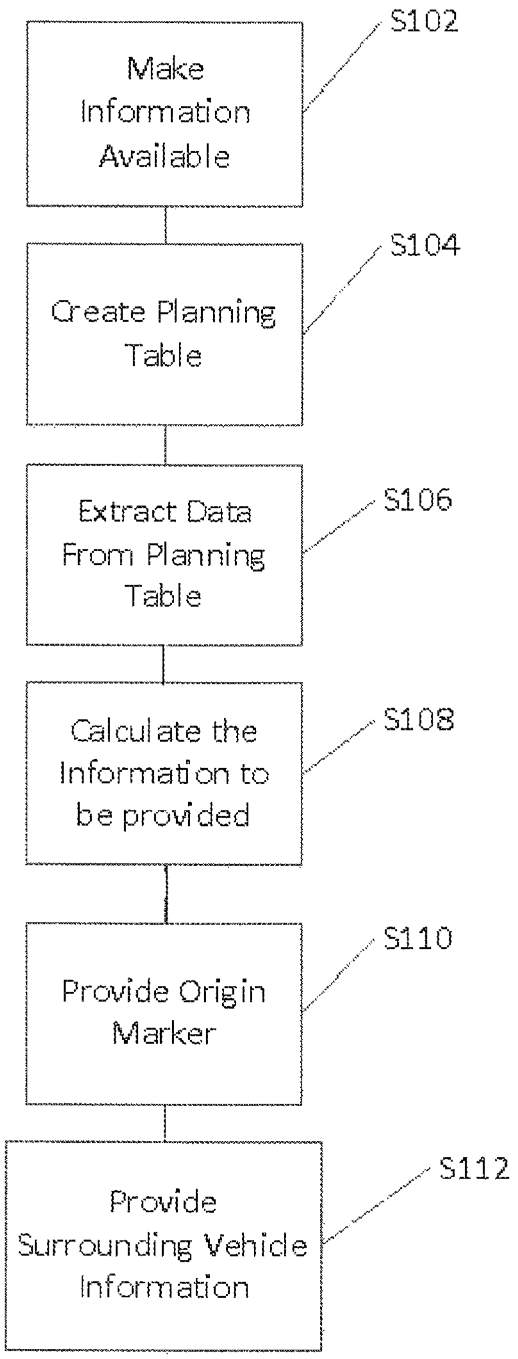
S102
Make Information Available
S104
Create Planning Table
S106
Extract Data From Planning Table
S108
Calculate the Information to be provided
S110
Provide Origin Marker
S112
Provide Surrounding Vehicle Information

PREDICTIVE EHORIZON

Predictive EHORIZON™ (Computer software and hardware for integrating navigational map data with electronic vehicle controls and software for providing driver alerts and control system inputs based upon vehicle parameters and navigational data).

CROSS REFERENCE TO PRIORITY DOCUMENTS

This is a U.S. national stage of application No. PCT/EP2011/051710, filed on 7 Feb. 2011. Priority is claimed on German Application No. 10 2010 007 260.5, filed 9 Feb. 2010, the content of which is incorporated here by reference.

BACKGROUND OF THE INVENTION

1. Field of the Invention

The present invention relates to a method for optimizing the provision of a predictive EHORIZON™ (Computer software and hardware for integrating navigational map data with electronic vehicle controls and software for providing driver alerts and control system inputs based upon vehicle parameters and navigational data) in a driver assistance system. In particular, the invention specifies a method suitable for making available an EHORIZON™ (Computer software and hardware for integrating navigational map data with electronic vehicle controls and software for providing driver alerts and control system inputs based upon vehicle parameters and navigational data) with sufficient accuracy in the case of changing available processor power in a driver assistance system.

2. Description of Prior Art

Driver assistance systems such as lane departure warning systems or adaptive cruise control (ACC) are known. Navigation systems are also finding widespread application both in the field of passenger cars and utility vehicles. A new generation of driver assistance systems make available to the driver and/or the vehicle information about the route lying ahead of the vehicle. This information, which is referred to as EHORIZON™ (Computer software and hardware for integrating navigational map data with electronic vehicle controls and software for providing driver alerts and control system inputs based upon vehicle parameters and navigational data), can comprise information about any bend courses, gradients, speed restrictions, or the like. As a result it is possible to inform the driver of hazardous situations clearly before such situations occur. This can lead to an improvement in safety and also to a reduction in the fuel consumption by virtue of the fact that it influences the engine management and/or the shift strategy of an automatic transmission. An EHORIZON™ (Computer software and hardware for integrating navigational map data with electronic vehicle controls and software for providing driver alerts and control system inputs based upon vehicle parameters and navigational data) can therefore transmit information about a bend lying directly ahead or an imminent gradient to an automatic transmission which, on the basis of this information, does not shift correspondingly until later into a higher gear speed and can therefore maintain rotational speed in an optimized range. Such an EHORIZON™ (Computer software and hardware for integrating navigational map data with electronic vehicle controls and software for providing driver alerts and control system inputs based upon vehicle parameters and navigational data) can also influence electrical energy management of a vehicle and also activate or deactivate functions in accordance with the route lying ahead. In an ACC an EHORIZON™ (Computer software and hardware for integrating navigational map data with electronic vehicle controls and software for providing driver alerts and control system inputs based upon vehicle parameters and navigational data) can be used to adapt the acceleration behavior of the vehicle to the course of the road.

In a driver assistance system of the type described above, an EHORIZON™ (Computer software and hardware for integrating navigational map data with electronic vehicle controls and software for providing driver alerts and control system inputs based upon vehicle parameters and navigational data) is provided by a horizon provider that precisely calculates the respective vehicle position based on stored digital maps, GPS information, gyroscope information, and/or wheel speed information, and transmits information continuously about the further course of the road into a BUS system (for example CAN bus) of the vehicle electronics. Further control systems, such as the engine management system, a transmission management system or an ACC, which are connected to this BUS system, build up the virtual picture of the road from the information provided using what is referred to as a reconstructor, and orient their control strategy to the expected course of the road.

To provide an EHORIZON™ (Computer software and hardware for integrating navigational map data with electronic vehicle controls and software for providing driver alerts and control system inputs based upon vehicle parameters and navigational data), the provider checks the position and possibly the route of the vehicle at fixed time intervals, determines the associated map detail of a digital map and the relevant roads, and provides necessary data via the BUS system. Such a procedure is configured for as constant as possible utilization of computing power. This requires a correspondingly large amount of computing power to be made available to ensure a sufficient provision of information of the provider into the BUS system even in situations with increased calculation expenditure such as change of route. This high level of available computing power is not called up and not required in the major part of the operating time.

SUMMARY OF THE INVENTION

An object of one embodiment of the invention is therefore to specify a method with which it is possible to make available an EHORIZON™ (Computer software and hardware for integrating navigational map data with electronic vehicle controls and software for providing driver alerts and control system inputs based upon vehicle parameters and navigational data) with sufficient accuracy, even when a relatively low maximum computing power of a provider is available.

According to one embodiment of the invention, a method for providing a predictive EHORIZON™ (Computer software and hardware for integrating navigational map data with electronic vehicle controls and software for providing driver alerts and control system inputs based upon vehicle parameters and navigational data) in a driver assistance system is disclosed wherein an EHORIZON™ (Computer software and hardware for integrating navigational map data with electronic vehicle controls and software for providing driver alerts and control system inputs based upon vehicle parameters and navigational data) provider in a driver assistance system of an assistance system application makes information available about an expected route course which is characterized in that the horizon provider creates a planning table that contains information about the expected route course and/or about data to be provided as a function of the route course and assigned to an expected position of the vehicle in the planning table. The data to be made available to the assistance system application is extracted from the planning table as a function of the current position of the vehicle.

Instead of requiring a constant computing power it is possible with the method according to one embodiment of the invention to provide an EHORIZON™ (Computer software and hardware for integrating navigational map data with electronic vehicle controls and software for providing driver alerts and control system inputs based upon vehicle parameters and navigational data) with sufficient accuracy even in the case of fluctuating available computing power levels. If more computing power is available than is required for the provision of a current EHORIZON™ (Computer software and hardware for integrating navigational map data with electronic vehicle controls and software for providing driver alerts and control system inputs based upon vehicle parameters and navigational data), predictive data as to how the upcoming situation for the next T seconds or x meters could look is already determined. This information is then stored in a planning table such as a look up table in a memory. It is then possible to retrieve the corresponding information from this table as a function of the current vehicle position. All that now happens is an assignment of the current position to data stored in the table that is to be transmitted. This data can then be transmitted directly by the provider without further calculations. If less computing power than required is available, the planning table can serve as a data buffer, and data from this lookup table can be used to transmit the provider data.

According to one embodiment of the invention it is possible that the data extracted from the planning table is provided that an origin marker which identifies the data as information extracted from a planning table. This permits the data to be verified by the assistance system applications or systems which are connected via the BUS system.

During the calculation of the planning table it may not be possible to decide with certainty what path will be taken in future. This may occur if road intersections or cross streets occur in the route section lying ahead. It is possible to provide according to one embodiment of the invention that the most probable path of the vehicle is firstly calculated, as predefined by a navigation system or as occurs on the basis of the road category (main road, secondary road, etc.) and subsequently to calculate the other path or paths. If the position in the planning table is not sufficient as a differentiation between two potential paths because the positional accuracy is too low, it is possible to provide according to one embodiment of the invention further distinguishing features to be stored in the planning table, on the basis of which the provider can decide which information is to be transmitted from the table. A suitable additional distinguishing feature may be, for example, the vehicles heading or direction of travel.

Furthermore, it is possible to provide according to one embodiment of the invention, if sufficient computer power is not available for calculating a plurality of possible paths, the most probable paths to be calculated exclusively or at least preferably. The probability of a path may be defined here according to one embodiment of the invention on the basis of the road classes (main roads or side roads), change in direction (straight ahead before turning off), path planning (following the planned route versus deviating from it), right before left (turning off to the right before turning off to the left, or vice versa in countries with left-hand driving), or based on surroundings sensor information etc. If sufficient memory is not available for all the elements or possible paths for a planning table, it is possible to provide, according to one embodiment of the invention, that preferably the most probable paths are kept in the memory. Furthermore, it is possible to provide, according to one embodiment of the invention, a plurality of planning tables stored in different memories, such as a high speed memory and a slow memory. In this context is it then possible, according to one embodiment of the invention, to store information about more probable paths in a high speed memory, while less probable paths are stored in a relatively slow memory. In the event of a deviation from a path which has previously been considered to be probable to a path which has previously been considered to be less probable it is then possible to provide, according to one embodiment of the invention, that already calculated information stored in the relatively slow memory based on the path probability transmitted into a higher speed memory.

When little computing power is available, it is possible to provide according to one embodiment of the invention that the planning table continues to be filled with data. However, since the filling of the table in such a situation no longer takes place to the degree that data flows out of the table, the data reserve formed by the planning table becomes smaller, but not to the extent that no further data at all would be calculated. This permits at least partial compensation of the data outflow from the planning table and also permits that EHORIZON™ (Computer software and hardware for integrating navigational map data with electronic vehicle controls and software for providing driver alerts and control system inputs based upon vehicle parameters and navigational data) data is reliably provided for as long as possible in situations where little computing power is available.

In one embodiment of the method according to one embodiment of the invention, it is possible to provide that entries are changed in the planning table only if the initial conditions have changed. That is to say for as long as the vehicle is moving on the most probable path and information from this path is stored in the table it is not necessary to carry out any adaptation of the table information. If the vehicle turns into a less probable path, the table can be adapted from this point onward. As a result of this procedure, there can be a saving in computing time.

The scope of the possibilities of the invention includes extending this procedure to the effect that paths of vehicles in the surroundings are also calculated. The information about the other vehicles can originate from surroundings sensors or be provided by the other vehicles as information which is transmitted via a direct and/or indirect vehicle-to-vehicle communication, for example by transmission protocols such as 802.11p, GSM, GPRS, EDGE, UMTS, LTE, CDMA, WiMax, etc. Indirect vehicle-to-vehicle communication means, according to one embodiment of the invention, that the communication takes place with intermediate connection of further systems such as a server of an external provider or the like.

By such a prediction it is possible to forecast whether traffic jams can form or hazardous situations can arise. If this is the case, such information can be integrated into the EHORIZON™ (Computer software and hardware for integrating navigational map data with electronic vehicle controls and software for providing driver alerts and control system inputs based upon vehicle parameters and navigational data) and stored in the planning table. In specific hazardous situations such as a risk of collision, it is possible to provide, according to one embodiment of the invention that, the information is also fed directly into the BUS system and provided with an urgency indication in the form of a flag. This permits a corresponding warning to be output to the driver and makes possible, if appropriate, interventions into the chassis dynamics, the engine management system, or the like, which are suitable for mitigating or eliminating the hazardous situation.

In a further embodiment of the invention it is possible to provide that the information stored in the planning table is provided by different components of the driver assistance system and/or a system communicatively connected thereto. It is therefore possible to distribute the calculation of the EHORIZON™ (Computer software and hardware for integrating navigational map data with electronic vehicle controls and software for providing driver alerts and control system inputs based upon vehicle parameters and navigational data) data among a plurality of computing units such as head unit, mobile radio processor, body controller, and the like. For this purpose it is possible to provide that each of the available computing units calculates a possible path of the vehicle and places the calculated data in the planning table or transmits it to the EHORIZON™ (Computer software and hardware for integrating navigational map data with electronic vehicle controls and software for providing driver alerts and control system inputs based upon vehicle parameters and navigational data) provider. The EHORIZON™ (Computer software and hardware for integrating navigational map data with electronic vehicle controls and software for providing driver alerts and control system inputs based upon vehicle parameters and navigational data) provider can then combine the individual paths to form a path tree and store said path tree in the planning table. A correspondingly extensive EHORIZON™ (Computer software and hardware for integrating navigational map data with electronic vehicle controls and software for providing driver alerts and control system inputs based upon vehicle parameters and navigational data) can then be provided on the basis of the data provided.

In a further embodiment of the invention it is possible that the computing power, which is provided by the provider and/or the further components of the driver assistance system and/or a system communicatively connected thereto and is intended for calculating the information to be incorporated into the planning table, is distributed such that in the case of undershooting of a definable minimum quantity of information that can be provided by the planning table about the most probable path of the vehicle the calculation of the information to be provided for the most probable path preferably takes place.

In one embodiment of the method it is possible that the information provided to an assistance application is both extracted from the planning table and also at least partially directly calculated at the time of provision. In this context it is possible to provide that the provider calculates information relating to the most probable path directly at the time of provision, while information relating to less probable paths is retrieved from the planning table. In this context it is possible to provide that the calculation of the information relating to the less probable paths can take place in the previously described fashion at the further system components.

In the text which follows, the invention is explained in more detail within the scope of exemplary embodiments, without the invention being, however reduced thereto.

In a first example, a mobile phone module or eCall module typically uses its entire computing power only very rarely. The computing unit of this module is used to provide an EHORIZON™ (Computer software and hardware for integrating navigational map data with electronic vehicle controls and software for providing driver alerts and control system inputs based upon vehicle parameters and navigational data). This EHORIZON™ (Computer software and hardware for integrating navigational map data with electronic vehicle controls and software for providing driver alerts and control system inputs based upon vehicle parameters and navigational data) is preferably based on reduced map data, for example only on the data relevant for driver assistance systems (advanced driver assistance system, ADAS) such as paths, road signs, etc., and can therefore function even with relatively small databases which can, if appropriate, be stored entirely in the Flash memory of the module. If the module is not required for its originally envisaged purpose, that is to say a telephone call is not being made at the current time or the entire computing power of the processor core of this module is not being used, the remaining processor power can be used to determine predictive EHORIZON™ (Computer software and hardware for integrating navigational map data with electronic vehicle controls and software for providing driver alerts and control system inputs based upon vehicle parameters and navigational data) data. If the module is used within the scope of its actual function, that is to say a telephone call, the EHORIZON™ (Computer software and hardware for integrating navigational map data with electronic vehicle controls and software for providing driver alerts and control system inputs based upon vehicle parameters and navigational data) can then be provided from a planning table. This can be signaled in the datastream by setting a corresponding indication (flag).

In a second example the EHORIZON™ (Computer software and hardware for integrating navigational map data with electronic vehicle controls and software for providing driver alerts and control system inputs based upon vehicle parameters and navigational data) is created on a head unit, together with the navigation and further infotainment functions. As a result of the different computing load of the various functions it is not possible to ensure that sufficient computing power is always available for the calculation of an EHORIZON™ (Computer software and hardware for integrating navigational map data with electronic vehicle controls and software for providing driver alerts and control system inputs based upon vehicle parameters and navigational data). A predictive EHORIZON™ (Computer software and hardware for integrating navigational map data with electronic vehicle controls and software for providing driver alerts and control system inputs based upon vehicle parameters and navigational data) is therefore created at times of sufficient computing power and is stored in a planning table so that the information stored there can be accessed when there too little computing power.

BRIEF DESCRIPTION OF THE DRAWINGS

FIG. 1 is a flowchart of a method for providing a predictive EHORIZON™ (Computer software and hardware for integrating navigational map data with electronic vehicle controls and software for providing driver alerts and control system inputs based upon vehicle parameters and navigational data) in a driver assistance system.

DETAILED DESCRIPTION OF THE PREFERRED EMBODIMENTS

A method for providing a predictive EHORIZON™ (Computer software and hardware for integrating navigational map data with electronic vehicle controls and software for providing driver alerts and control system inputs based upon vehicle parameters and navigational data) in a driver assistance system is shown in the flowchart of FIG. 1. An EHORIZON™ (Computer software and hardware for integrating navigational map data with electronic vehicle controls and software for providing driver alerts and control system inputs based upon vehicle parameters and navigational data) provider uses at least navigation data in a driver assistance system of an assistance system application to make information available about an expected route (S102). The EHORIZON™ (Computer software and hardware for integrating navigational map data with electronic vehicle controls and software for providing driver alerts and control system inputs based upon vehicle parameters and navigational data) provider creates a planning table (S104). The planning table contains information about the expected route and/or about data to be provided as a function of the route and an expected position of the vehicle. The data to be made available to the assistance system application is extracted from the planning table as a function of the current position of the vehicle S106.

In one embodiment, the information provided to an assistance application is both extracted from the planning table and also at least partially directly calculated at the time of provision (S108).

In one embodiment, the data extracted from the planning table is provided with an origin marker that identifies the data as information extracted from a planning table (S110).

In one embodiment, information relating to paths of vehicles in the surroundings are provided with the EHORIZON™ (Computer software and hardware for integrating navigational map data with electronic vehicle controls and software for providing driver alerts and control system inputs based upon vehicle parameters and navigational data) (S112).

In one embodiment, the information stored in the planning table is provided by different components of the driver assistance system and/or a system communicatively connected thereto.

Preferably, the planning table contains information about the most probable path of the vehicle and about at least one possible alternative path.

The computing power which is provided by the provider and/or the further components of the driver assistance system and/or a system communicatively connected thereto and is intended for calculating the information to be incorporated into the planning table is distributed in such a way that in the case of undershooting of a definable minimum quantity of information which can be provided by the planning table about the most probable path of the vehicle the calculation of the information to be provided for the most probable path preferably takes place.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing a predictive driver assistance system for a vehicle, comprising:

making information available about an expected route course by a provider in a driver assistance system of an assistance system application;

creating, by the provider a planning table that contains the information that comprises at least one of:

an expected route course and data provided as a function of the expected route course and assigned to an expected position of the vehicle;

extracting the information from the planning table to be made available to the assistance system application based at least in part on a vehicle's current position;

calculating the information to be incorporated into the planning table by distributed computing power to a plurality of computing devices provided by one or more of:

the provider, at least one component of the driver assistance system, and a system communicatively connected to the driver assistance system;

distributing the computing power to the plurality of computing devices when less than a definable minimum quantity of the information can be provided by the planning table about a most probable path of the vehicle, wherein each of the plurality of computing devices calculates a possible path of the vehicle; and providing the information to the assistance system application by extracting the information from the planning table and at least partially directly calculating the information at a time of provision.

2. The method as claimed in claim 1, wherein the information further comprises a most probable path of the vehicle and at least one possible alternative path.

3. The method as claimed in claim 1, further comprising:

calculating the information for the most probable path using the distributed computing power.

4. The method as claimed in claim 1, wherein data extracted from the planning table is provided with an origin marker that identifies the data as being extracted from the planning table.

5. The method as claimed claim 1, further comprising providing additional information relating to paths of other vehicles in a vicinity of the vehicle by the provider.

6. The method as claimed in claim 1, wherein the information comprises a most probable path of the vehicle and at least one possible alternative path.

7. The method as claimed in claim 6, further comprising:

calculating the information for the most probable path using the distributed computing power.

8. The method as claimed claim 1, further comprising:

combining the possible paths of the vehicle to form a path tree; and storing the path tree in the planning table.

* * * * *